Figure 1:
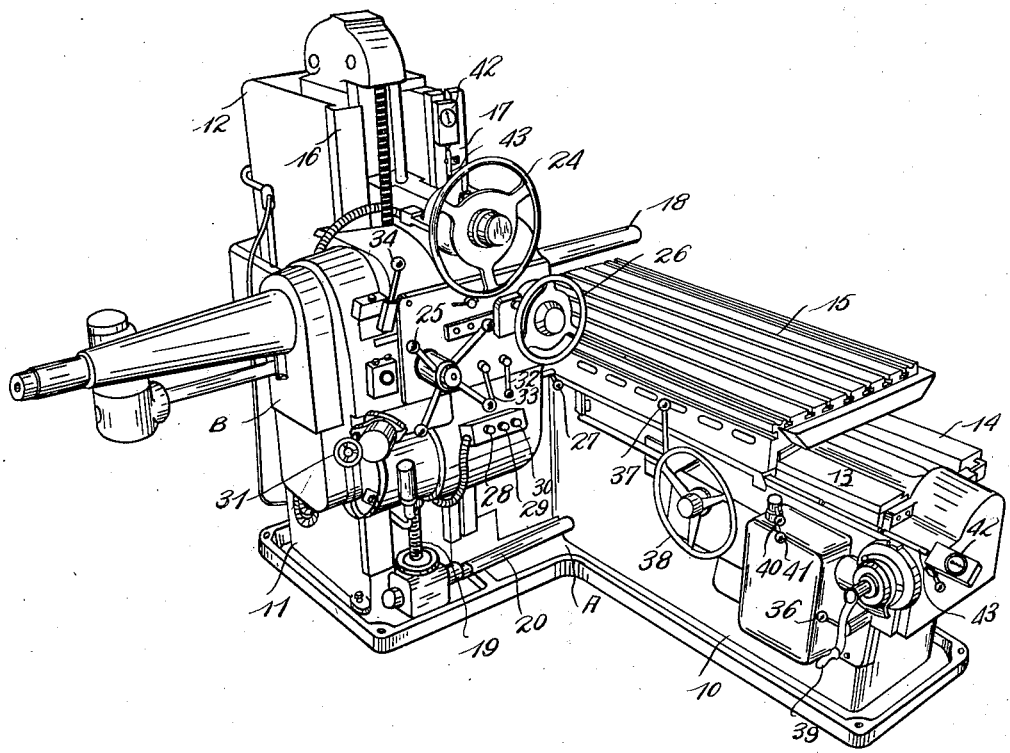

Dec. 16, 1941.    H. M. LUCAS ET AL    2,266,647
HORIZONTAL BORING MACHINE
Filed Dec. 7, 1939    2 Sheets-Sheet 1

INVENTORS
HENRY M. LUCAS
BY HALLIS N. STEPHAN
Kwis Hudson & Kent
ATTORNEYS

Dec. 16, 1941.    H. M. LUCAS ET AL    2,266,647
HORIZONTAL BORING MACHINE
Filed Dec. 7, 1939    2 Sheets-Sheet 2

INVENTORS
HENRY M. LUCAS
HALLIS N. STEPHAN
BY Kwis Hudson & Kent
ATTORNEYS

Patented Dec. 16, 1941

2,266,647

UNITED STATES PATENT OFFICE 2,266,647

HORIZONTAL BORING MACHINE

Henry M. Lucas and Hallis N. Stephan, Cleveland Heights, Ohio, assignors, by mesne assignments, to The Lucas Machine Tool Company, Bratenahl, Ohio, a corporation of Ohio Application December 7, 1939, Serial No. 308,023

5 Claims. (Cl. 77—3)

The present invention relates to horizontal boring and milling machines and more particularly to the arrangement of the various elements and control devices thereof.

The object of the present invention is the provision of a novel horizontal boring machine having all or substantially all of the control levers, etc., which are used in the normal operation of the machine, accessible from a position at one side of the table and in front of the spindle head.

Figure 2:
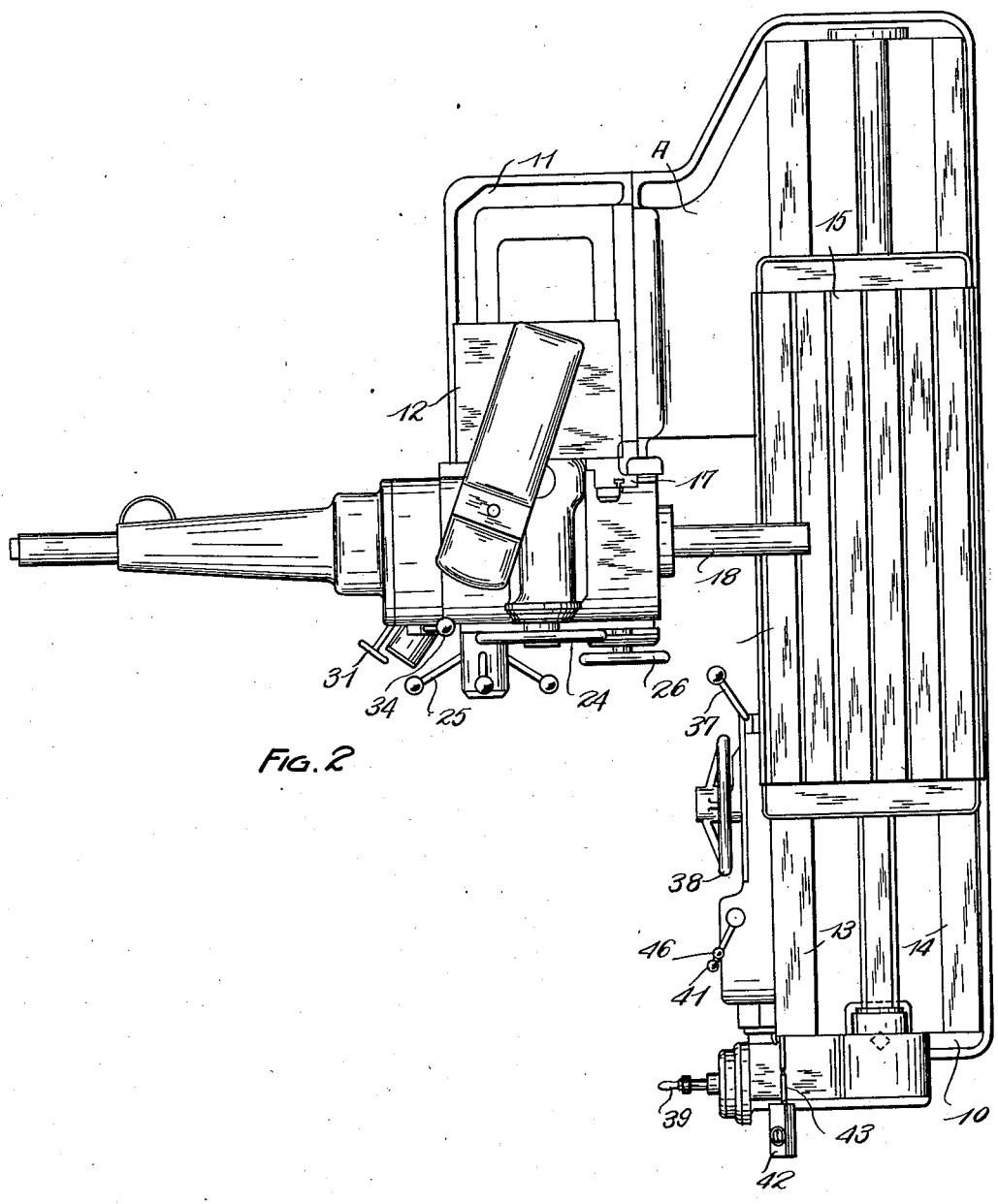

The invention resides in certain details of construction, and combinations and arrangements of parts and further objects and advantages thereof will be apparent to those skilled in the art to which the invention relates from the following description of the preferred embodiment thereof described with reference to the accompanying drawings forming a part of this specification, in which similar reference characters designate corresponding parts and in which:

Fig. 1 is a perspective view of a horizontal boring machine embodying the present invention; and Fig. 2 is a plan view of the machine shown in Fig. 1.

Referring to the drawings, Fig. 1 shows a horizontal boring machine comprising a bed A having a main section 10 and a transversely extending auxiliary section 11, including a vertical column 12, projecting from the left-hand side thereof, as viewed in Fig 1. The top of the main section 10 of the bed A is provided with ways 13 and 14 upon which a table 15 is slidably supported for movement in a horizontal plane and in a direction longitudinally of the main section 10 of the bed. As shown, the column 12 is made as a separate part bolted to the bed A but it will be apparent that both parts may be formed integral if desired. The front face of the column 12 is provided with vertical ways 16 and 17 which project down almost to the floor and upon which ways the spindle head B is slidably supported for vertical movement. The tool spindle 18 is slidably and rotatably supported in the spindle head B in the conventional manner. In the present instance the spindle head extends down a considerable distance below the spindle which gives a large or wide bearing.

Aside from the foregoing, the particular construction of the spindle head B forms no part of the present invention per se and will not be described in detail. Suffice it to say that it is moved vertically along the ways 16 and 17 by a lead screw 19 adapted to be driven from an electric motor located within the main section 10 of the bed A through the medium of a shaft 20. The tool spindle 18 is adapted to be rotated and reciprocated from an electric motor housed within the spindle head and operatively connected thereto in a suitable manner such that the spindle can be either jogged or moved at various speeds in either direction. The various manual controls located on the spindle head include the following: a spindle head elevating hand wheel 24; a turnstile 25 for rapidly positioning the spindle; a spindle feed hand wheel 26, a spindle head clamp lever 27; start, stop, and reverse push buttons 28, 29, and 30, respectively, for controlling the spindle drive motor; motor drive speed change hand wheel 31, levers 32 and 33 for shifting the gears in the feed gear change transmission; and a lever 34 for shifting the spindle drive back gears.

As previously stated, the table 15 is adapted to be reciprocated longitudinally of the section 10 of the bed A by a main driving motor located within the bed 10 and adapted to be operatively connected to a longitudinally extending lead screw rotatably supported in the section 10 of the bed and operatively connected to the table in a conventional manner. The various controls located on the section 10 of the bed A include the following: a clutch-operating lever 36 adapted to connect the main driving motor with the mechanism for reciprocating the table or with the shaft 20 for reciprocating the spindle head B; a control lever 37 for controlling the direction of movement of either the work table 15 or the spindle head B when actuated by the main driving motor at either feed or rapid traverse rates; a hand wheel 38 for manually moving the table at a high rate of speed; a crank 39 for manually moving the table at a low rate of speed; and control levers 40 and 41 for shifting the gears of the feed change transmission associated with the main driving motor. Both the spindle head B and the work table 15 are provided with micrometer dials 42 adapted to cooperate with rod gauges, designated generally as 43, for accurately positioning the respective members.

It will be observed that all of the controls which are necessary for the normal operation of the machine are accessible to an operator standing at the left-hand side of the bed, as viewed in the drawings, and in front of the spindle head.

If an outboard support for the spindle 18 is desired, the bed can be extended to the right, as viewed in the figures of the drawings, and provided with an outboard column including a vertically movable backrest block which can be operatively connected to the shaft 20 or an extension thereof so as to be moved vertically with the spindle head B. Such a column might be either formed integral with the bed A or as a detachable part thereof.

From the foregoing description of the preferred embodiment, it will be apparent that the objects of the invention have been accomplished and that there has been provided a horizontal boring machine having an L-shaped bed and having the controls so located that they are accessible to an operator standing at one side of the bed and in front of the spindle head. While the preferred embodiment of the invention has been described in considerable detail, we do not wish to be limited to the particular construction shown which may be varied within the scope of this invention and it is our intention to hereby cover all adaptations, modifications and uses thereof which come within the practice of those skilled in the art to which the invention relates and we particularly point out and claim as our invention the following:

1. A machine of the character described comprising: a bed including a main section and an auxiliary section extending transversely of the main section; a reciprocable work table supported on the main section of said bed for movement longitudinally thereof in a horizontal plane; a column rising from the auxiliary section of said bed; a reciprocable spindle head supported on said column for vertical movement; a longitudinally reciprocable horizontal rotatable spindle at one side of said column supported in said spindle head with its axis extending transversely of the direction of movement of said table; and members for controlling the reciprocal movements of said table, spindle head, and spindle, and the rotation of said spindle; said last-mentioned members being accessible from a position adjacent to said bed and the side of said column at which said spindle is located.

2. A machine of the character described comprising: a bed having a main section and an auxiliary section extending transversely of the main section; a reciprocable work table supported on the main section of said bed for movement longitudinally thereof in a horizontal plane; a column rising from the auxiliary section of said bed; a reciprocable spindle head supported on one side of said column for vertical movement; a longitudinally reciprocable horizontal rotatable spindle at one side of said column supported in said spindle head with its axis of rotation extending transversely of the direction of movement of said table; and members located on the sides of the machine which form the angle between the main section of the bed and the side of the auxiliary section of the bed at which the spindle is located for controlling the reciprocal movements of said table, spindle head, and spindle, and the rotation of said spindle.

3. A machine of the character described comprising: a bed having a main section and a transversely extending auxiliary section; a reciprocable work table supported on the main section of said bed for movement longitudinally thereof and in a horizontal plane; a column rising from the auxiliary section of said bed; a reciprocable spindle head supported on one side of said column for vertical movement; a longitudinally reciprocable horizontal rotatable spindle extending transversely of the direction of movement of said table; members located on said spindle head for controlling the reciprocal movements of said spindle head and spindle and the rotation of said spindle; and members for controlling the reciprocal movements of said table; said last mentioned members being located on the side of the main section of said bed adjacent to said column and in front of said spindle head.

4. A machine of the character described comprising: an L-shaped bed; a reciprocable work table supported on one section of said bed for reciprocation in a horizontal plane; a column rising from the other section of said bed at one side of said table; a reciprocable spindle head supported on said column for vertical movement; a longitudinally reciprocable horizontal rotatable spindle extending transversely of the direction of movement of said table and at one side of said column; and members for controlling the reciprocal movements of said table, spindle head and spindle, and the rotation of said spindle; said last-mentioned members being located on the sides of the machine which form the enclosed angle of the base.

5. A machine of the character described comprising: an L-shaped bed; a reciprocable work table supported on one section of said bed for reciprocation in a horizontal plane; a column rising from the other section of said bed at one side of said table; a reciprocable spindle head supported on one side of said column for vertical movement; a longitudinally reciprocable horizontal rotatable spindle extending transversely of the direction of movement of said table and supported in said spindle head; members located on said spindle head for controlling the reciprocal movements of said spindle head and said spindle and the rotation of said spindle; and members located on the side of said machine adjacent to said column and in front of said spindle head for controlling the reciprocal movements of said table.

HENRY M. LUCAS.
HALLIS N. STEPHAN.